United States Patent [19]

Ford

[11] Patent Number: 4,638,966
[45] Date of Patent: Jan. 27, 1987

[54] SUPPORT MEMBER FOR HANGING CABLE

[75] Inventor: James H. Ford, Pittsburgh, Pa.

[73] Assignee: Robroy Industries, Verona, Pa.

[21] Appl. No.: 748,191

[22] Filed: Jun. 21, 1985

[51] Int. Cl.[4] .............................................. F16L 3/08
[52] U.S. Cl. ...................................... 248/62; 248/72; 248/74.3
[58] Field of Search .................... 348/62, 74.3, 60, 58, 348/63, 74.2, 231, 228, 231.8, 72

[56] References Cited

U.S. PATENT DOCUMENTS

| | | | |
|---|---|---|---|
| 1,945,332 | 1/1934 | Robinson | 248/228 |
| 2,780,429 | 2/1957 | Vanier | 248/60 |
| 3,286,052 | 11/1966 | Neumann | 248/228 |
| 3,474,994 | 10/1969 | Swanquist | 248/228 |
| 3,894,707 | 7/1975 | Heard | 248/231 |
| 4,395,009 | 7/1983 | Bormke | 248/74.4 |
| 4,524,937 | 6/1985 | Zizan | 248/62 |

FOREIGN PATENT DOCUMENTS 1038226 9/1953 France ............................... 248/74.3

Primary Examiner—Reinaldo P. Machado
Assistant Examiner—Alvin Chin-Shue
Attorney, Agent, or Firm—Stanley J. Price, Jr.

[57] ABSTRACT

A cable supporting structure includes a longitudinally extending channel-shaped support structure having a pair of spaced side walls with free end portions turned inwardly to form opposed longitudinally extending flanges. A locking strap has opposite end portions and an intermediate portion therebetween. A support member is positioned within the support structure to extend between the side walls with opposite ends thereof respectively supported by the flanges. The support member includes a pair of slots for receiving the locking strap to cause the intermediate portion to extend around a central body portion of the support member in overlapping relation therewith. The support member includes resiliently deflectable extensions at the ends thereof for producing frictional contact between the support member and the side walls tending to resist movement of the support member within the support structure. The opposite end portions of the locking strap are connected to form a loop of a preselected size extending around the body portion at the intermediate portion thereof and around a cable at the connected opposite end portions to support the cable against the support structure. There is also included a support member which is capable of being used to support a cable and a method for supporting a cable against a support structure.

27 Claims, 5 Drawing Figures

SUPPORT MEMBER FOR HANGING CABLE

BACKGROUND OF THE INVENTION

1. Field of the Invention

This invention relates to conduit supporting structure and more particularly to a combination locking strip and support member for securing one or more cables to a longitudinally extending channel-shaped support structure in a manner permitting the cable to be secured in a selective position along the length of the support structure.

2. Description of the Prior Art

It is well known to use interlocking clamp plates in suspending electrical cable, pipes, conduits and the like from a channel-shaped support structure. Generally the clamp plates are curved to form a seat for the cable. The clamp plates are notched at one end to form a shoulder engageable with the flanges of the channel structure and the opposite ends of the plates are bolted together so as to securely grip the cables. Examples of this type of cable hanger are disclosed in U.S. Pat. Nos. 3,145,962; 3,486,726; 3,522,921; 3,547,385; 3,650,499; and 4,417,711.

The recognized disadvantage of the above described cable hanger is that the clamp plates are connected by threaded members and the like which are subject to damage when exposed to a corrosive environment. Corrosive damage to the metallic clamp plates and the threaded connection of a bolt to the plates can prevent effective reuse of the conduit hanger and substantially weaken the structural strength of the clamp plates. Also, if the threaded connection of the bolt to the plates becomes so corroded that it freezes the connection, movement of the cable hanger on the channel-shaped support structure for selective positioning of the cable can be substantially prevented.

U.S. Pat. Nos. 3,226,069; 3,532,311; and 4,119,285 represent other metallic clamping elements to be used in conjunction with a channel structure which could be similarly subjected to weaken the structure or prevent its future selective positioning within the channel structure. Additional, the clamping elements shown therein would appear to be even less adaptable for accommodating cables of different sizes than would the types of clamp plates described hereinabove. U.S. Pat. No. 3,266,069 employs overlapping metal bands which can be adjusted but are difficult to initially install and properly size around a cable. U.S. Pat. No. 3,532,311 appears to be preformed for accommodating a particular size cable. Additionally, U.S. Pat. No. 4,119,285 includes a pair of clamp jaws which are presized to resiliently support a limited range of cable sizes therein.

As an alternative to the metallic clamping plates for securing cables to a channel structure, it is known to use flexible stainless-steel bands to secure cables, such as pipes or conduits, to a channel structure as illustrated in U.S. Pat. No. 3,633,859. One of the primary advantages of this type of cable connecting device is the use of flexible bands which are not subject to corrosion but are adjustable to accommodate a plurality of cables. U.S. Pat. No. 4,379,537 appears to employ metal bonding straps on a cable hanger which is not associated with a channel structure. Although the straps may be subject to corrosion, they can at least be adjusted for different sizes or numbers of cables. U.S. Pat. No. 3,677,339 discloses a tube bank arrangement in which a plurality of tube coils is connected to a spacer bar by U-shaped tube clips which are retained in grooves of the spacer bar. Locking strips engage the tongues of the tube clips to retain the coils in the tube clips and secure them to the spacer bar.

It is also well known to utilize nylon cable ties for securing together a plurality of cables, wires, hoses and the like. The nylon cable ties are particularly adaptable in corrosive environments because they are chemically resistant to solvents, alkalies, acids, oils and greases. U.S. Pat. No. 3,632,070 discloses such a nylon cable tie used in conjunction with a right-angled mounting bracket for supporting a plurality of cables.

Another device that is commercially available for gathering and directing single or groups of cables is a plastic cable holder having a gate for facilitating cable entry and preventing unintentional cable exit. The cable holder is adaptable for connection to a mounting panel. However, the above described cable ties and cable holders are not readily adaptable alone for securing cables and the like to a channel-shaped structure.

On the other hand, there are two prior art support members which are of interest and are capable of being utilized in conjunction with a longitudinally extending channel-shaped support structure. The particular type of structure which both employ could be defined to include a pair of spaced side walls having free end portions turned inwardly to form opposed, longitudinally extending flanges. The support member for U.S. Pat. No. 3,651,546 is referred to as an elongated fastening element. The elongated fastening element in one embodiment disclosed therein is constructed of a tubular metal portion having depending support walls with a slot therethrough for receipt of a pipe hanger strap or similar device. The tubular metal portion surrounds a resilient body and includes in each side wall thereof slots extending inwardly from each of its opposite ends. The resilient body extends beyond the base of these slots to be aligned with a major portion of each of the slots. Accordingly, to install the first embodiment of U.S. Pat. No. 3,651,546, the upper half of the tubular metal portion is inserted between the flanges of the support structure and rotated to align the end slots thereof with the flanges. As the flanges extend into the slots, the resilient body is deformed to provide biasing against the inner edges of the flanges. In another embodiment, the resilient body extends outwardly from an end of the upper portion of the tubular metal portion. Similar insertion and rotation results in the resilient body creating frictional contact on the side walls of the support structure after the flanges are again aligned with end slots in the tubular metal portion. Accordingly, whether creating frictional contact on the edges of the flanges or on the interior surfaces of the side walls, the embodiments of U.S. Pat. No. 3,651,546 includes one means for insuring that the elongated fastening element when properly positioned within the support structure, will tend to remain in position but will be capable of selective longitudinal movement along the support structure. However, the elongated fastening element is composed of two different materials, one of which is metal and subject to corrosion in the same manner as described hereinabove for other prior art devices, and includes the depending support walls. The support walls would receive the pipe hanger strap or device in a location spaced from the support structure to significantly add to the overall height or thickness of the combined cable and support structure configuration when the pipe or cable is secured thereto.

The other support member which is of interest is described as a framing channel cable clamp and is old by Thomas and Betts Company. The framing channel cable clamp is made of a resiliently deformable, noncorrosive material and includes structure which is again intended to cause it to be resiliently positioned between the flanges for selective longitudinal positioning along the support structure. However, rather than creating biasing against the side walls or the edges of the flanges of the support structure, the framing channel cable clamp appears to include a pair of opposed, resilient wing elements at each flange with one wing element exterior of the support structure and one wing element interior of the support structure. The wing elements are adapted to create opposing frictional contact on the exterior surface and interior surface of each of the flanges. Consequently, since a portion of the framing channel cable clamp extends outwardly of the support structure in overlying relationship to the flanges, a cable or cables secured to the support structure would not be in direct contact with the support structure to slightly add to the overall height or thickness of the combined cable and support structure configuration. More significant than the minor increase in overall height or thickness is the arrangement utilized in the framing channel cable clamp for installing a cable tie therein and the lack of accessability to the opposite ends of the cable tie for properly securing a cable to the support structure. The framing channel cable clamp includes a single slot in an interior portion thereof which loosely receives a cable tie and allows it to lie longitudinally within the interior of the support structure. In other words, if the framing channel cable clamp were to be utilized in a vertically extending support structure, the cable tie might inadvertently freely slide out of the slot. If it were oriented the other way in the slot, the free end could slide completely into the slot so that the end of the tie having the locking slot would be positioned against the slot to the clamp. On the other hand, even if the support structure were to extend horizontally so that the cable tie would not slide into or out of the slot, the slot configuration of the framing channel cable clamp can present problems. Nylon cable ties typically used to secure cables are flexible but tend to have sufficient resilience to cause them to remain relatively straight until the ends are joined to form a loop. Consequently, with the tie loosely received within the slot, the ends thereof might lie naturally within the interior of the support structure to complicate retrival and to make it more difficult to quickly join the ends around a cable. Accordingly, although the framing channel cable clamp appears to be capable of being selectively positioned longitudinally within the support structure and to maintain that position when a cable is to be secured thereto, the cable tie to be utilized to secure the cable is not held in any particular position or orientation for simple insertion of the cable between the ends thereof. Finally, because the framing channel cable clamp employs the preformed, opposed wing configuration, it is adapted to be installed between flanges of a particular size and shape to prevent it from being utilizied on other support structures having a similar configuration but different flanges.

Therefore, there is a need for a cable support member that is resistant to damage in a corrosive environment and sufficiently adaptable for securing cables and the like to a channel-shaped support structure where the support member is easily assembled and disassembled for alignment of the cable against the support structure and adjustable for selective positioning of the cables longitudinally on the channel-shaped support structure.

SUMMARY OF THE INVENTION

In accordance with the present invention, there is provided a cable supporting structure including a longitudinally extending channel-shaped support structure. The support structure includes a pair of spaced side walls having free end portions turned inwardly to form opposed longitudinally extending flanges. Locking strip means is capable of extending around cable means for securing the cable means to the support structure. The locking strip means includes opposite end portions and an intermediate portion therebetween. A support member is positioned within the support structure to extend between the flanges with opposite ends thereof respectively supported by the flanges. The support member includes slotted means for receiving the locking strip means to extend around a body portion of the support member in overlying relation with the body portion. The support member includes biasing means extending from at least one of the opposite ends for producing frictional contact between the support member and the side walls tending to resist movement of the support member within the support structure. There is means associated with the locking strip means for connecting the opposite end portions to form a loop of preselected size extending around the body portion of the support member at the intermediate portion and around the cable means at the connected opposite end portions to support the cable means against the support structure.

Further, in accordance with the present invention, there is provided a cable strap support member of the type which is capable of being used to secure a cable to a longitudinally extending channel-shape support structure with a cable strap. The support structure includes a pair of spaced side walls having free end portions turned inwardly to form opposed, longitudinally extending flanges. The strap has opposite end portions with an intermediate portion therebetween which end portions are capable of being connected to form a loop of a preselected size to extend around the cable. The cable strap supporting member includes opposite ends with a central body portion and two side edge portions extending therebetween. The body portion is spaced from each of the side edge portions to define each of a pair of slots therebetween. The opposite ends are capable of being respectively positioned against the flanges to be supported thereby. There is biasing means extending from at least one of the opposite ends to be capable of producing frictional contact between the support member and the side walls when the opposite ends are respectively positioned against the flanges. The support member is capable of being maintained by the frictional contact within the support structure between the side walls with the ends thereof against the flanges with the strap having the opposite end portions extending respectively from the slots outwardly of the support structure with the intermediate portion extending around the body portion.

Still further, in accordance with the present invention, there is provided a method of supporting at least one cable including the step of positioning an intermediate portion of a locking strap in overlying relation with a central body portion of a support member. The support member is positioned in a longitudinally extending channel-shaped support structure between a pair of spaced side walls thereof having free end portions turned inwardly to form opposed longitudinally extending flanges. The support member is maintained with opposite ends thereof adjacent the opposed flanges and with opposite end portions of the locking strap extending outwardly therefrom. The cable is positioned adjacent the flanges between the opposed end portions of the locking strap. The opposed end portions of the locking strap are joined to form a loop around the body portion and the cable. The method includes the final step of reducing a size of the loop to maintain the cable in abutting relation with the opposed flanges of the support structure.

Accordingly, it is an object of the present invention to provide cable supporting structure which is adaptable for securing one or more cables to a channel-shaped support structure in a manner that faciliates selective positioning of the cable longitudinally on the channel and is resistant to damage due to exposure to a corrosive environment.

A further object of the present invention is to provide a support member which can be installed in the channel-shaped support structure against the flanges for support thereby while being maintained against the flanges prior to installation of the cable on the support stucture.

It is another object of the present invention to provide such a support member which directs a locking strip or strap thereof outwardly from the support structure for readily positioning of the cable therebetween prior to its being secured to the support structure.

It is yet another object of the present invention to provide a method of supporting a cable where the support member is maintained in a proper position within a support structure to allow the cable to be positioned between the outwardly extending end portions of the locking strap prior to joining the end portions thereof to form a loop around the cable.

These and other objects of the present invention will be more completely disclosed and described in the following specification, the accompanying drawings, and the appended claims.

DESCRIPTION OF THE PREFERRED EMBODIMENTS

Figure 1:
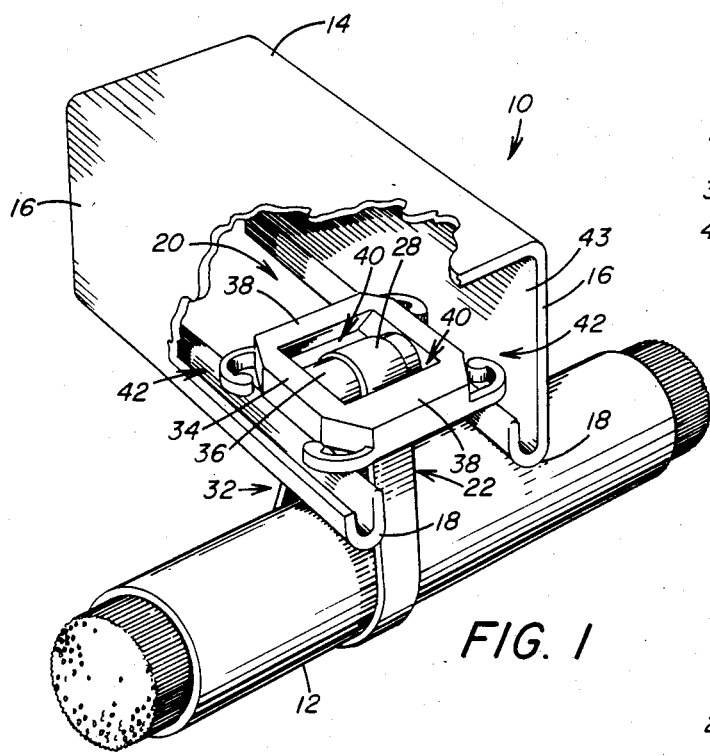
FIG. 1 is a fragmentary, isometric view of a cable secured to a channel-shaped support structure illustrating a preferred support member positioned in the support structure with a strap connected to the support member and wrapped around the cable while including various features of the invention.

As seen in FIG. 1, there is provided a cable supporting structure 10 for securing an electrical cable 12, conduit, pipe, or the like, to a support structure 14. The support structure 14 could alternatively include a portion of a cable tray which is well known in the art or may include, as seen in FIG. 1, a separately formed U-shaped structure. More significantly, the support structure 14 would be longitudinally extending and channel-shaped to include a pair of spaced side walls 16 having free end portions turned inwardly to form opposed longitudinally extending flanges 18. In a well-known manner, the support structure 14 can be suitably secured to a ceiling or an overhead structure (not shown) to support conduits, pipes, cables, or the like. Additionally, it should be understood that the support structure 14 could be installed against a wall or the like to extend either horizontally or vertically for supporting a plurality of cables. The cable support structure 10 as shown in FIG. 1 is shown with the particular orientation therein for the purposes of clarity of illustration. In other words, it would be reasonable to have the cable 12 overlie the support structure 14 rather than the support structure overlie the cable 12 as shown in FIG. 1. It should also be noted that, although only one cable 12 is shown in FIG. 1, the present invention could be utilized with any number and/or size of cables and that the inclusion of only one cable 12 is for the purposes of illustration only.

Figure 4:
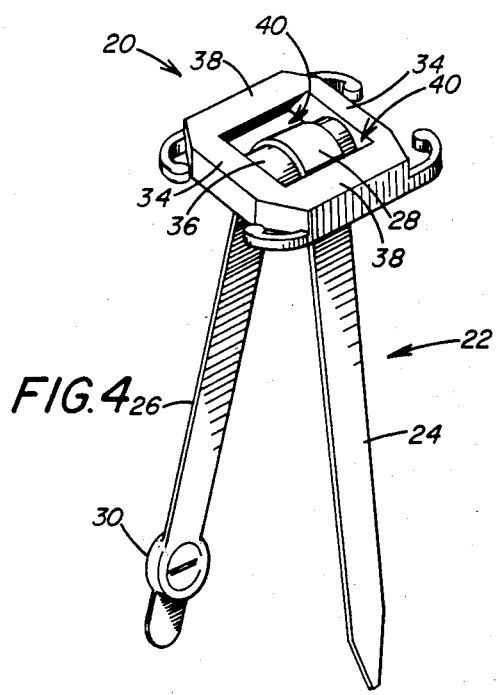
FIG. 4 is an isometric view of the support member with a strap extending through the slots thereof and the ends of the strap diverging outwardly therefrom to be capable of being joined to form a loop.

To secure the cable 12 to the support structure 14, a support member 20 is used in conjunction with a locking strip means 22. The locking strip means 22, as better seen in FIG. 4, is preferably a tie strap such as a nylon cable tie which is well known in the cable supporting art. Specifically, the strap 22 has a first end portion 24 and a second end portion 26 with an intermediate portion 28 therebetween. The first end portion 24 and the second end portion 26 are adapted for locking engagement in a wellknow manner. Specifically, the second end portion 26 is provided a locking slot 30 for receipt of the first end portion 24 therein. With the first end portion 24 inserted into the locking slot 30, the strap 22 can be formed into an adjustable loop 32 (FIG. 1). The size of the loop 32 can be adjusted to accommodate a wide range of sizes and numbers of cables 12 therein. The locking slot 30 is such that the first end portion 24 can be securely locked therein and can be further drawn therein to create tension on the cable 12 to draw it into abutting engagement with the flanges 18 of the support structure 14 in a manner which will be described in detail hereinafter.

As seen in FIGS. 1-5, the preferred support member 20 includes ends 34 with a central body portion 36 and two side edge portions 38 extending therebetween. The body portion 36 is spaced from each of the side edge portions 38 to define a pair of slots 40 therebetween. The ends 34 are capable of being respectively positioned against the flanges 18 to be supported thereby. As thus described, the preferred support member 20 is adapted for receiving the strap 22 to cause it to extend around the body portion 36 in a manner which allows the strap 22 to be formed into the loop 32 with the intermediate portion 28 overlying the body portion 36 as the remainder of the strap 22 extends around the cable 12 to secure the cable 12 against the support structure 14. However, the preferred support member 20 includes additional features for ease of installation within the support structure 14, for maintaining its position with the support structure 14 and for insuring that the strap 22 is properly oriented for the receipt of the cable 12 between the end portions 24, 26 thereof.

Specifically, as mentioned hereinabove, the orientation of the support structure 14 is such that it may be oriented horizontally, vertically, or with the flanges extending upwardly or downwardly. Accordingly, it would be advantageous for the support member 20 to initially be installed within the support structure 14 in a manner which will insure its proper positioning against the flanges 18 and at a desired longitudinal position within the support structure 14. In other words, it would be desirable for the support member to be propery retained toward the flanges 18 at a desired location for easy alignment of the cable 12 prior to its being secured to the support structure 14. As will be seen, it is also just as desirable for there to be provided means for insuring that the strap 22 is properly retained and oriented for easy installation of the cable 12 between the end portions 24, 26 thereof. However, the manner in which the preferred support member 20 insures this orientation of the strap 22 will be discussed in detail hereinbelow.

First, to insure that the support member 20 is capable of being properly positioned within the support structure 14, the preferred support member 20 includes biasing means 42 at at least one of the ends 34 for producing a frictional contact between the support member 20 and the interior surfaces 43 of the side walls 16 tending to resist undesired movement of the support member 20 within the support structure 14. Generally, the biasing means 42 would include at least one resiliently deflectable extension from at least one of the ends 34 of the support member 20. In the preferred support member 20, both ends 34 are identical and each includes two resiliently deflectable extensions. Specifically, the preferred biasing means 42 includes a pair of resiliently deflectable extensions in the form of curved elements 44 which are secured at opposite sides of the end 34. Each of the curved elements 44 has a base 46 secured to one of the sides of the end 34 to extend outwardly therefrom toward a corresponding side wall 16. The curved element 44 terminates at a free end 48 which is located between the opposite sides of the end 34. The free end 48 is capable of resting against the interior surface 43 of the corresponding side wall 16 of the support structure 14 to produce frictional contact between the support member 20 and the side walls 16. The frictional contact would tend to resist any unintended movement of the support member 20 within the support structure 14 when positioned between the side walls 16 but will allow it to be selectively positioned against the flanges 18 and along the support structure 14 for selective longitudinal positioning therein.

Figure 2:
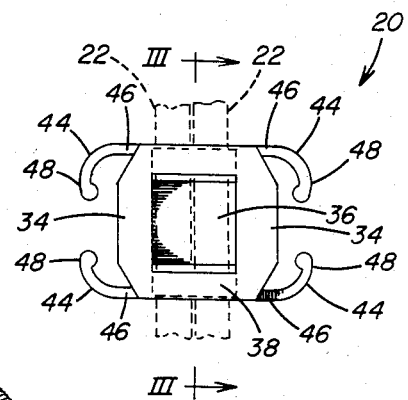
FIG. 2 is a top plan view of the support member shown in FIG. 1 including various features of the invention.
Figure 5:
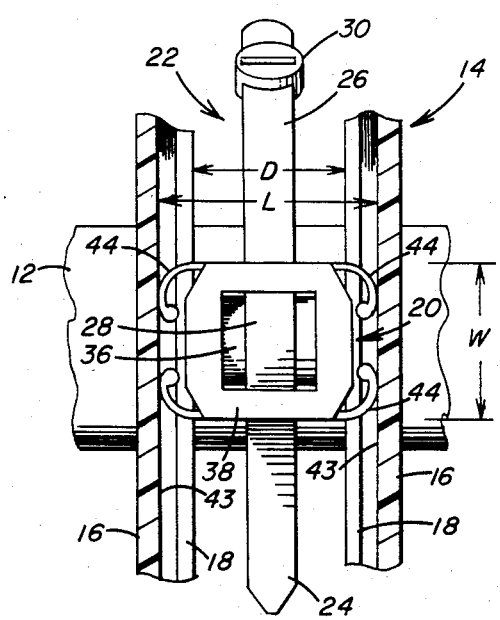
FIG. 5 is a sectional view of the preferred support member as seen from within the support structure in the desired position for securing a cable thereto.

Specifically, as seen in FIG. 2, the curved elements 44 are in an unbiased condition prior to installation within the support structure 14. On the other hand, as seen in FIG. 5, the preferred support member 20 is properly installed within the support structure 14 to cause the curved elements 44 thereof to be inwardly deflected by contact with the interior surfaces 43 of the side walls 16 to establish the desired biasing therebetween. Clearly, the biasing is primarily established by providing an overall length of the support member 20 which is slightly greater than the corresponding distance between the interior surfaces 43 of the side walls 16. Although it should be clear that the preferred curved configuration of the curved element 44 is appropriate for selectively longitudinally positioning the support member 20 within the support structure 14, another advantage associated with the installation of the support member 20 within the support structure 14 will be discussed in detail hereinbelow.

Figure 3:
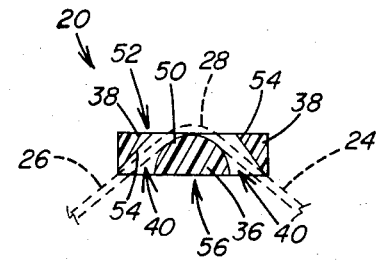
FIG. 3 is a sectional view of the support member as seen along line 3—3 of FIG. 2.

With the biasing means 42 insuring that the support member 20 can be properly positioned and retained in the desired position within the support structure 14, it is desirable to insure that the strap 22 will be properly oriented for easy alignment with a cable 12 to be secured thereby. As seen in FIG. 3, the preferred body portion 36 includes an arcuate curved surface 50 at an interior side 52 of the support member 20 between the slots 40. Additionally, each of the side edge portions 38 (FIG. 3) has an interior surface 54 defining its respective slot 40 which is tapered outwardly from the curved surface 50 of the body portion 36 toward an exterior side 56 of the support member 20. Accordingly, the intermediate portion 28 of the strap 22 is curved around the body portion 36 with the first end portion 24 and the second end portion 26 diverging from the slots 40 outwardly of the exterior side 56 of the support member 24. Consequently, when the strap 22 is so positioned within the slots 40 and the support member 20 is positioned within the support structure 14 with the ends 34 thereof against the flanges 18, the first end portion 24 and the second end portion 26 of the strap 22 will extend outwardly of the support structure 14. With the support member 20 properly positioned and the strap 22 properly extending therefrom, the cable 12 can be conveniently installed between the end portions 24, 26, as seen in FIG. 5, for conveniently and simply forming the loop 32 therearound for properly securing the cable 12 to the support structure 14.

The preferred orientation of the slots 40 is such that a strap 22 formed of almost any material would tend to extend outwardly of the exterior surface 56 of the support member 22. On the other hand, because the preferred strap 22 would be a nylon cable tie, it should be recognized that these types of straps are flexible but tend to remain relatively straight with the ends thereof being sufficiently resilient to resist any bend such as occurs at the intermediate portion 28. Consequently, the preferred slot means in the form of the slots 44 is adapted to receive the cable 22 and to retain the cable 22 in the slots 40 for the desired extension outwardly therefrom.

While the preferred support member 20 includes the pair of slots 40 as described hereinabove, it should be recognized that a slight alteration to the preferred support member 20 could provide it a form which could be said to include a single slot. Specifically, if the support member were thicker and the interior surfaces of each of the side edge portions were to be extended to curve about the curved surface of the body portion, the side edge portions could be joined at the interior side of the support member to encircle the body portion thereof. With such a configuration, the slot of this alternative support member would extend entirely around the body portion but would have an entrance and an exit at the exterior side of the support member. With such a configuration, the first end portion 24 of the strap 22 could be inserted in the entrance of the larger slot and extended therethrough to pass completely around the body portion until the intermediate portion thereof is aligned with the body portion. Although such an alternative support member could be provided, the formation would be more difficult than the formation of the preferred support member 20. The preferred support member 20 is molded of a non-metallic, non-conductive material. Clearly, molding two separate slots 40 would be simplier than molding a single slot of the type described for the alternative support member. Additionally, it should be clear that the support member 20 would preferably be formed of a resiliency deflectable material in order to provide proper resilience and support for the biasing means in the form of the curved elements 44. It should be recognized that forming the support member 20 of a resiliently deflectable material such as plastic, nylon, or some type of polymeric material would still provide sufficent rigidity to the body portion 36 and the ends 34 to properly retain and support the cable 12 while still allowing the biasing feature to be incorporated in the curved elements 44.

Thus far, the discussion of the preferred support member 20 of FIGS. 1-5 has been directed to its use with a single strap 22. However, the length of each of the slots 40 can be seen to be significantly longer than the width of the single strap 22. In some cable supporting installations, it is desirable to include two or more straps for additional protection to insure that the cable 12 is properly mounted against the support structure 14. Since the strap 12 is capable of being moved in the slots 40 for selective positioning of the strap 22 between the side walls 16, it is possible to include an additional strap 22 for the desired added support. As seen in FIG. 2, a pair of straps 22 are shown in phantom to show how two straps 22 could be included in the preferred support member 20 to generallly double the amount of supporting force that can be provided around a cable 12 or a plurality of such cables for properly securing a greater weight or a larger quantity of cables to the support structure 14. It should also be understood that there is nothing in the preferred cable supporting structure 10 to prevent the support structure 14 from including flanges 18 which are generally wider apart than as generally shown in the Figures to require a different support member 20 which would have an overall length which is significantly greater than its width. Such a support member 20 could then include slots 40 which are longer than generally shown in the Figures to accommodate even more straps 22 for properly securing an even heavier cable 12 or a larger group of cables 12 to the support structure 14.

Having described the preferred cable supporting structure 10 and the manner in which the support structure 14, support member 20, and strap 22 are utilized to secure a cable 12 to the support structure 14, it is appropriate to discuss the method of assembling the various components. Specifically, after the support structure is properly secured to an overhead, wall, or any other similar surface with a desired orientation as described hereinabove, the length, size, and number of locking straps should be selected for properly extending around the cable or plurality of cables to be secured thereto. Assuming only one locking strap is to be used, it is initially positioned through the slots 40 of the support member 20 with the intermediate portion 28 thereof in overlying relation with the central body portion 36 of the support member 20. With the locking strap retained in the slots 40 with the end portions 24, 26 extending outwardly from the exterior side 56 of the support member 20, the support member 20 can be positioned within the support structure 14.

Positioning the support member 20 in the support structure 14 can be accomplished in several ways. If the support structure 14 has an open end, the support member 20 could clearly be installed through the open end. On the other hand, which is more than likely the case, the support member 20 would probably be installed between the flanges 18. As seen in FIG. 5, the width W of the preferred support member 20 is less than the distance D between the flanges 18, so that the support member 20 can be longitudinally oriented between the flanges 18 for direct insertion therebetween. When the support member 20 is fully positioned within the support structure 14, the support member 20 can be reoriented to extend transversely between the side walls 16. With the curved elements 44 provided in the form described hereinabove, the support member 20 can be reoriented as the curved elements 44 are initially deflected to allow the rotation until properly oriented as seen in FIG. 5. Accordingly, providing the curved elements 44 with the preferred configuration allows them to be deflected to a greater degree when the support member 20 is being rotated to extend between the side walls 16 but also creates greater force during this greater deflection which would tend to prevent the support member 20 from being displaced from its desired transverse position between the side walls 16 once established.

If the width W is slightly greater than the distance D between the flanges 18, the support member 20 could still be installed longitudinally between flanges for rotation against the side walls 16. With the end portions 24, 26 of the strap 22 extending outwardly from the exterior side 56, the support member 20 could be tilted to allow one of the side edge portions 38 to first enter between the flanges 18 prior to the complete insertion of the support member 20 between the side walls 16. Again, rotation of the support member 20 would secure it between side walls 16. In fact, if the support structure 14 were deep enough, the support member 20 might be installed by first inserting one of the ends 34 until the other end 34 is also positioned between the side wall 16. As the support member 20 is leveled out to be aligned with the flanges 18, the curved elements 44 would again produce the desired frictional contact with the walls 16 for properly retaining of the support member 20 within the support structure 14.

It should be noted in all of the methods of installation described hereinabove, the end portions 24, 26 of the strap 22 would tend to extend outwardly of and remain outwardly of the interior of the support structure 14 while the support member 20 remains totally within the interior of the support structure 14. With the strap 22 being firmly held by the support member 20 and extending outwardly from support structure 14, the strap 22 can be used to assist in properly aligning and positioning the support member 20 between the side walls 16. In any case, after the support member 20 is properly positioned, it will be maintained with its opposite ends 34 adjacent the opposite flanges 18 and with the opposite end portions 24, 26 of the strap 22 extending outwardly from the support structure 14. Depending on the particular arrangement for securing the cable 12 to the support structure 14, the support member 20 with the strap 22 extending therefrom can be longitudinally positioned within the support structure 14 for proper alignment with the cable 12.

After the support member 20 is properly positioned, the cable 12 can be positioned adjacent the flanges 18 between the end portions 24, 26 of the strap 22. It should now be clear that independent of the orientation of the support structure 14, the end portions 24, 26 will extend in a diverging manner for easy positioning of the cable therebetween. With the cable positioned adjacent the flanges 18, the first end portion 28 will be joined to the second end portion 26 by insertion through the locking slot 30 to form a loop 32 around the body portion 36 and the cable 12. Reducing the size of the loop 32 will maintain the cable 12 in abutting relation with the opposed flanges 18 of the support structure 14. Additionally, the preferred strap 22 is such that additional tension can be created on the cable 12 by further insertion of the end portion 24 within the locking slot 30 of strap.

Finally, the preferred support structure 14, support member 20, and strap 22 are all be fabricated of non-metallic and non-corrosive material in order for the cable supporting structure 10 to be capable of being used in a corrosive environment. Additionally, the support member 20 and the strap 22 are preferably formed of resiliently deflectable material to conveniently provide the biasing feature of the support member 20 and the typical resilience found in the straps 22. However, if these components are not to be exposed to a corrosive environment, it should be clear that the support structure 14, the support member 20, and the strap 22 could be fabricated from some type of material to still include many of the features of the invention as claimed.

According to the provisions of the patent statutes, I have explained the principal, preferred construction and mode of operation of my invention and have illustrated and described what I now consider to represent its best embodiments. However, it should be understood that, within the scope of the appended claims, the invention may be practiced otherwise than is specifically illustrated and described.

I claim:

1. Cable supporting structure comprising:
    a longitudinally extending channel-shaped support structure, said support structure including a pair of spaced side walls having free end portions turned inwardly to form opposed longitudinally extending flanges;
    locking strip means capable of extending around cable means for securing said cable means to said support structure, said locking strip means including opposite portions and an intermediate portion therebetween;
    a support member positioned within said support structure to extend between said flanges with opposite ends of said support member respectively supported by said flanges;
    said support member including slotted means for receiving said locking strip means to extend around a central body portion of said support member in overlying relation with said body portion;
    said support member including integral resiliently deflectable biasing means extending from at least one of said opposite ends for producing frictional contact betewen said support member and said side walls tending to resist movement of said support member within said support structure; and
    means associated with said locking strip menas for connecting said opposite end portions to form a loop of a preselected size extending around said body portion of said support member at said intermediate portion and around said cable means at the connected said opposite end portions to support said cable means against said support structure.

2. Cable supporting structure as set forth in claim 1, wherein said support member is selectively longitudinally movable against said frictional contact produced by said biasing means to selectively position said support member longitudinally within said support structure.

3. Cable supporting structure as set forth in claim 1, wherein said loop is placed under tension extending around said body portion and said cable means to draw said cable means into abutting engagement with said support structure.

4. Cable supporting structure as set forth in claim 1, wherein said support member is held by said frictional contact against said flanges, said intermediate portion is located between said side walls on said body portion, and said opposite end portions extend outwardly of said support structure to be capable of receiving said cable means therebetween prior to forming said loop around said cable means.

5. Cable supporting structure as set forth in claim 1, further including means for tensioning said locking strip means around said cable means in abutting relation with said support structure.

6. Cable supporting structure as set forth in claim 1, including a pair of said resiliently deflectable extensions respectively at opposite sides of said one of said opposite ends.

7. Cable supporting structure as set forth in claim 6, wherein said resiliently deflectable extension is a curved element having a base secured to one of said opposite sides of said one of said opposite ends to extend outwardly therefrom toward a corresponding said side wall to terminate at a free end against said corresponding side wall at a longitudinal location thereon between said opposite sides.

8. Cable supporting structure as set forth in claim 6, wherein said support member is integrally formed of a resiliently deflectable, non-corrosive material.

9. Cable supporting structure as set forth in claim 6, wherein said opposite ends are identical, both including said pair of said resiliently deflectable extensions extending therefrom.

10. Cable supporting structure as set forth in claim 1, wherein said slotted means includes at least one slot in said support member which is adapted to receive and retain said locking strip means in said slot.

11. Cable supporting structure as set forth in claim 10, wherein said slotted means is constructed and arranged to direct said opposite end portions of said locking strip means outwardly of said support structure.

12. Cable supporting structure as set forth in claim 10, wherein said slotted means includes two parallel slots in said support member at opposite sides of said body portion, each of said slots being defined by said body portion and a side edge portion of said support member.

13. Cable supporting structure as set forth in claim 12, wherein said body portion has an arcuate curved surface on an interior side of said support member between said slots and each of said side edge portions has an interior wall defining its respective slot which is tapered outwardly from said curved surface of said body portion toward an exterior side of said support member to cause said intermediate portion of said locking strip means to curve around said body portion as said opposite end portions diverge from said slots outwardly of said exterior side of said support member.

14. Cable supporting structure as set forth in claim 12, wherein said intermediate portion of said locking strip means is adjacent said body portion within said support structure and said opposite end portions respectively extend from said slots outwardly of said support structure to be capable of receiving said cable means therebetween as said cable means extends transversely of said support structure prior to forming said loop around said cable means.

15. Cable supporting structure as set forth in claim 1, wherein said locking strip means includes a strap of flexible material extending through said slotted means with said intermediate portion thereof around said body portion, said strap including said opposite end portions secured together to form said loop around said body portion and said cable means, and said looped strap is capable of being moved in said slotted means of said support member for selective positioning of said strap between said side walls.

16. Cable supporting structure as set forth in claim 15, wherein said locking strip means includes a plurality of said straps postioned in side-by-side relation and extending in a looped configuration around said body portion and said cable means to support said cable means against said support structure.

17. A cable strap support member of the type which is capable of being used to secure at least one cable to a longitudinally extending channel-shaped support structure with a cable strap; said support structure including a pair of spaced side walls having free end portions turned inwardly to form opposed, longitudinally extending flanges; said strap having opposite end portions with an intermediate portion therebetween which said opposite end portions are capable of being connected to form a loop of a preselected size to extend around said cable, said cable strap support member comprising:
opposite ends with a central body portion and two side edge portions extending therebetween, said body portion being spaced from each of said edge portions to define each of a pair of slots therebetween;
said opposite ends capable of being respectively positioned against said flanges to be supported thereby;
said support member including integral resiliently deflectable biasing means extending from at least one of said opposite ends to be capable of producing frictional contact between said support member and said side walls when said opposite ends are respectively positioned against said flanges; and
said support member capable of being maintained by said frictional contact within said support structure betweeen said side walls with said opposite ends thereof against said flagnes with said strap having said opposite end portions extending respectively from said slots outwardly of said support structure with said intermediate portion extending around said body portion.

18. The cable strap support member as set forth in claim 17, wherein said opposite ends, said body portion, said side edge portions, and said biasing means are integrally formed of a non-corrosive material.

19. The cable strap support member as set forth in claim 17, wherein said biasing means includes a pair of resilienty deflectable curved elements, each of said curved elements includes a base secured to one of opposite sides of said one of said opposite ends to exend outwardly therefrom to terminate at a free end located between said opposite sides, and said free end is capable of producing said frictional contact.

20. The cable strap support member as set forth in claim 17, wherein said body portion and said slots are constructed and arranged to retain said strap therein and to direct said opposite end portions outwardly of an exterior side of said support member.

21. The cable strap support member as set forth in claim 17, wherein said frictional contact tends to resist longitudinal movement of said support member within said support structure when said opposite ends are against said flanges.

22. The cable strap support member as set forth in claim 21, wherein said support member is capable of being selectively longitudinally moved within said support structure against said frictional contact by said biasing means to preselectively longitudinally position said support member within said support structure.

23. A method of supporting at least one cable comprising the steps of:
positioning an intermediate portion of a locking strap in overlying relation with a central body portion of a support member including integral resiliently deflectable biasing means extending from at least one end thereof;
positioning said support member in a longitudinally extending channel-shaped support structure between a pair of spaced side walls thereof having free end portions turned inwardly to form opposed longitudinally extending flanges;
maintaining said support member with opposite ends thereof adjacent said opposed flanges and said biasing means in contact with said side walls and with opposite end portions of said locking strap extending outwardly therefrom;
positioning said cable adjacent said flanges between said opposite end portions of said locking strap;
joining said opposite end portions of said locking strap to form a loop around said body portion and said cable; and
reducing a size of said loop to maintain said cable in abutting relation with said opposed flanges of said support structure.

24. The method as set forth in claim 23, wherein said maintaining said support member is provided by frictional contact between said support member and said side wall.

25. The method as set forth in claim 23, including selectively longitudinally moving said support member to a desired longitudinal position along said support structure prior to said maintaining said support member.

26. The method as set forth in claim 23, including maintaining said intermediate portion in said overlying relation with said central body portion during said positioning of said support member.

27. The method as set forth in claim 26, wherein said maintaining said intermediate portion causes said opposite end portions of said locking strap to extend outwardly of said support structure during said positioning said support member therein.

* * * * *